US012427941B2

(12) United States Patent
Wang et al.

(10) Patent No.: US 12,427,941 B2
(45) Date of Patent: Sep. 30, 2025

(54) MAGNETORHEOLOGICAL FLUID AUTOMOBILE BUMPER

(71) Applicant: Zhejiang Normal University, Jinhua (CN)

(72) Inventors: Zhishen Wang, Jinhua (CN); Xinsheng He, Jinhua (CN); Chongqiu Zhou, Jinhua (CN); Chunfu Gao, Jinhua (CN); Fengchao Ye, Jinhua (CN)

(73) Assignee: Zhejiang Normal University, Jinhua (CN)

( * ) Notice: Subject to any disclaimer, the term of this patent is extended or adjusted under 35 U.S.C. 154(b) by 401 days.

(21) Appl. No.: 18/108,894

(22) Filed: Feb. 13, 2023

(65) Prior Publication Data

US 2023/0286453 A1 Sep. 14, 2023

(30) Foreign Application Priority Data

Mar. 9, 2022 (CN) .......................... 202210222215.2

(51) Int. Cl.
  *B60R 19/02* (2006.01)
  *B60R 19/32* (2006.01)
  *F16F 9/53* (2006.01)

(52) U.S. Cl.
  CPC ............ *B60R 19/023* (2013.01); *B60R 19/32* (2013.01); *F16F 9/535* (2013.01)

(58) Field of Classification Search
  CPC ......... B60R 19/04; B60R 19/38; B60R 19/40; B60R 19/54; B60R 19/20; B60R 19/023; B60R 19/32; B60R 2019/1893; F16F 13/007; F16F 15/022; F16F 9/535

USPC ....... 293/107, 108, 109, 110, 102, 118, 134, 293/132, 135

See application file for complete search history.

(56) References Cited

U.S. PATENT DOCUMENTS

| | | | | |
|---|---|---|---|---|
| 6,217,090 | B1 * | 4/2001 | Berzinji | B60R 19/48 293/106 |
| 6,390,253 | B1 * | 5/2002 | Oliver | F16F 9/535 188/267.2 |
| 9,067,552 | B1 * | 6/2015 | Cheng | B60R 19/40 |
| 9,352,712 | B2 * | 5/2016 | Zhou | B60R 19/26 |

(Continued)

FOREIGN PATENT DOCUMENTS

| | | | | |
|---|---|---|---|---|
| CN | 102359538 B | * | 7/2013 | |
| CN | 103597241 A | * | 2/2014 | F16F 9/535 |

(Continued)

*Primary Examiner* — Amy R Weisberg
*Assistant Examiner* — Denise Lynne Esquivel
(74) *Attorney, Agent, or Firm* — CARTER, DELUCA & FARRELL LLP

(57) ABSTRACT

Disclosed is a magnetorheological fluid automobile bumper, and belongs to the field of automobile bumpers. The magnetorheological fluid automobile bumper comprises a rear bumper body, wherein two front bumper bodies are symmetrically hinged to the front side of the rear bumper body, the ends, close to each other, of the two front bumper bodies are in butt joint with each other, a connecting rod is jointly installed between the front bumper body and the rear bumper body, one end of the connecting rod is hinged to the front bumper body, and the other end of the connecting rod is slidably installed with the rear bumper body; and a plurality of magnetorheological fluid buffers are installed on the rear side of the rear bumper body.

8 Claims, 5 Drawing Sheets

(56) References Cited

U.S. PATENT DOCUMENTS 9,371,048 B2 * 6/2016 Farooq .................... B60R 19/18
2005/0087410 A1 * 4/2005 Namuduri ............... F16F 9/535
                                                                                                                    188/267.2

FOREIGN PATENT DOCUMENTS

| CN | 105889404 | A | * | 8/2016 | ............ F16F 13/007 |
| CN | 108454546 | A | * | 8/2018 | ........... B60R 19/023 |
| CN | 110341633 | A | * | 10/2019 | |
| CN | 214450776 | U | * | 10/2021 | |

* cited by examiner

MAGNETORHEOLOGICAL FLUID AUTOMOBILE BUMPER

CROSS-REFERENCE TO RELATED APPLICATION

This patent application claims the benefit and priority of Chinese Patent Application No. 202210222215.2, filed with the China National Intellectual Property Administration on Mar. 9, 2022, the disclosure of which is incorporated by reference herein in its entirety as part of the present application.

TECHNICAL FIELD

The present disclosure relates to the technical field of automobile bumpers, in particular to a magnetorheological fluid automobile bumper.

BACKGROUND

With the increase of automobile ownership in China, the probability of automobile collision is also greatly increased. In order to reduce the damage caused by automobile collision to vehicles and passengers, various kinds of automobile shock absorbers have been researched and developed.

After searching, China Patent No.CN102359538B discloses an automobile collision magnetorheological shock absorber. The automobile collision magnetorheological shock absorber includes a working cylinder, an impact piston, an impact piston rod and at least one damping tube. One end of the impact piston rod is fixed with one end of the impact piston, and the other end of the impact piston rod extends from the working cylinder through a sliding bearing at one end of the working cylinder. One end of the damping tube is fixed at the bottom of the working cylinder and communicates with the working cylinder. A sliding piston is installed at an opening in the end, communicating with the working cylinder, of the damping tube. A sealing baffle is arranged at the tail end of the damping tube. A circular hole is formed in the center of the sealing baffle. A sealing membrane is fixed in the circular hole. Silicone oil is filled between the sliding piston and the sealing membrane of the damping tube. A permanent magnet is installed on the outer circumference of the damping tube. One end of the impact piston is fixed with the impact piston rod. The outer circumference of the other end of the impact piston is provided with a sliding bearing and a sealing ring. The space between the other end of the impact piston and the bottom of the working cylinder is filled with a magnetorheological fluid.

The magnetorheological fluid is a novel fluid with controllable fluidity, and belongs to an active research branch in intelligent materials. The magnetorheological fluid has Newtonian fluid characteristics with low viscosity when no magnetic field is applied on the outside. When a magnetic field is applied, the magnetorheological fluid is Bingham fluid with high viscosity and low fluidity.

In the prior art, the characteristics of the magnetorheological fluid under the action of the magnetic field are applied in the impact damping field of automobile bumpers. However, in the actual use process, the existing magnetorheological fluid bumpers still have the following shortcomings. The bumpers mainly adopt the characteristics of the magnetorheological fluid under the magnetic field to reduce the impact, and the damping effect is not ideal, which still results in certain damage to vehicles and people. Therefore, disclosed is a magnetorheological fluid automobile bumper.

SUMMARY

In order to solve the defects existing in the prior art, provided is a magnetorheological fluid automobile bumper.

In order to achieve the above purpose, the present disclosure adopts the following technical scheme.

A magnetorheological fluid automobile bumper includes a rear bumper body. Two front bumper bodies are symmetrically hinged to the front side of the rear bumper body. The ends, close to each other, of the two front bumper bodies are in butt joint with each other. A connecting rod is jointly installed between the front bumper body and the rear bumper body. One end of the connecting rod is hinged to the front bumper body, and the other end of the connecting rod is slidably installed with the rear bumper body.

A plurality of magnetorheological fluid buffers are installed on the rear side of the rear bumper body.

Further, the magnetorheological fluid buffer includes an outer sleeve. A magnet is installed on the outer side of the outer sleeve. A push rod is slidably arranged at the front end of the outer sleeve. One end of the push rod is installed with the rear bumper body. An inner sleeve is movably arranged inside the outer sleeve. Two extrusion blocks are symmetrically and slidably arranged at the two ends of the inner sleeve. The ends, away from each other, of the two extrusion blocks are provided with push blocks. The end, away from the rear bumper body, of the push rod extends into the outer sleeve and is installed with one of the push blocks. The inner wall of the outer sleeve at the end away from the push rod is provided with second springs. The second springs are installed with the other push block. The inner sleeve is filled with a magnetorheological fluid. A fluid outlet is formed in the inner sleeve, and a buffer block is slidably arranged in the fluid outlet. A third spring is arranged in the inner sleeve. The buffer block is installed with the third spring. The buffer block is in frictional contact with the inner wall of the outer sleeve.

Further, a sliding chute is formed in the side, close to the front bumper bodies, of the rear bumper body. A sliding seat is slidably arranged in the sliding chute. The end, away from the front bumper bodies, of the connecting rod is hinged with the sliding seat. A first spring is installed in the sliding chute. One end of the first spring is connected with the sliding seat, and the other end of the first spring is fixed with the tail end of the sliding chute.

Further, the extrusion block is of a T-shaped structure. One end of the extrusion block is slidably arranged inside the inner sleeve, and the other end of the extrusion block is fixed with the push block. The end, positioned inside the inner sleeve, of the extrusion block is provided with a sealing strip.

Further, two fluid outlets are symmetrically formed in the inner sleeve. Buffer blocks are slidably arranged in the two fluid outlets. A sealing strip is arranged between the buffer block and the fluid outlet. The two ends of the third spring are fixedly installed with the two buffer blocks, respectively.

Further, the end of the buffer block is provided with anti-skid convex teeth, and the anti-skid convex teeth are in frictional contact with the inner wall of the outer sleeve.

Further, anti-skid concave ring grooves matched with the anti-skid convex teeth are formed in the inner wall of the outer sleeve.

Further, the two front bumper bodies are hinged with the end of the rear bumper body through hinged seats, and the end, close to the front bumper bodies, of the connecting rod is hinged with the inner sides of the front bumper bodies through hinged seats.

Further, the two front bumper bodies jointly form an arc-shaped bar.

Compared with the prior art, the present disclosure has the following beneficial effects.

Firstly, the bumper in the present disclosure is structurally composed of the front bumper bodies and the rear bumper body, and the front bumper bodies are two symmetrical arc-shaped plate bodies. The front bumper bodies can be deformed when being collided, and the impact force is transmitted to the sliding seat and the first spring on the rear bumper body by the connecting rod, and the first spring is used to realize the first buffering effect.

Secondly, after the first buffering effect is realized between the front bumper body and the rear bumper body through the first spring, the impact force can be transmitted to the magnetorheological fluid buffer. The impact force firstly acts on the push rod, and then promotes the front side push block to push the extrusion block and squeeze the magnetorheological fluid in the inner sleeve. At the same time, the inner sleeve moves in the outer sleeve, and the push block on the rear side squeezes the second spring, so that the second buffering effect is realized.

Thirdly, when the extrusion block squeezes the magnetorheological fluid in the inner sleeve, due to the increase of internal pressure, the buffer block leaves the fluid outlet of the inner sleeve, so that frictional contact with the inner wall of the outer sleeve is realized, and frictional resistance is formed. Meanwhile, the magnetorheological fluid in the inner sleeve also enters the gap between the inner sleeve and the outer sleeve. In addition, because the inner sleeve is displaced in the outer sleeve, the magnetorheological fluid can gradually approach the magnet. Under the action of the magnetic field, the viscosity of the magnetorheological fluid is increased, and the magnetorheological fluid is gradually "solidified". At this time, the magnetorheological fluid can seal the fluid outlets and help the buffer block keep friction with the inner wall of the outer sleeve, so that the third buffering effect is realized.

In conclusion, when the bumper in the present disclosure is collided, the three buffering and damping effects can be realized, so that the damage of impact force to vehicles and personnel is effectively reduced, and the safety of the vehicles and personnel is ensured.

BRIEF DESCRIPTION OF THE DRAWINGS

The attached figures serve to provide further understanding of the present disclosure and constitute a part of the specification, together with embodiments of the present disclosure, serve to explain the present disclosure and do not constitute limitation of the present disclosure.

Figure 1:
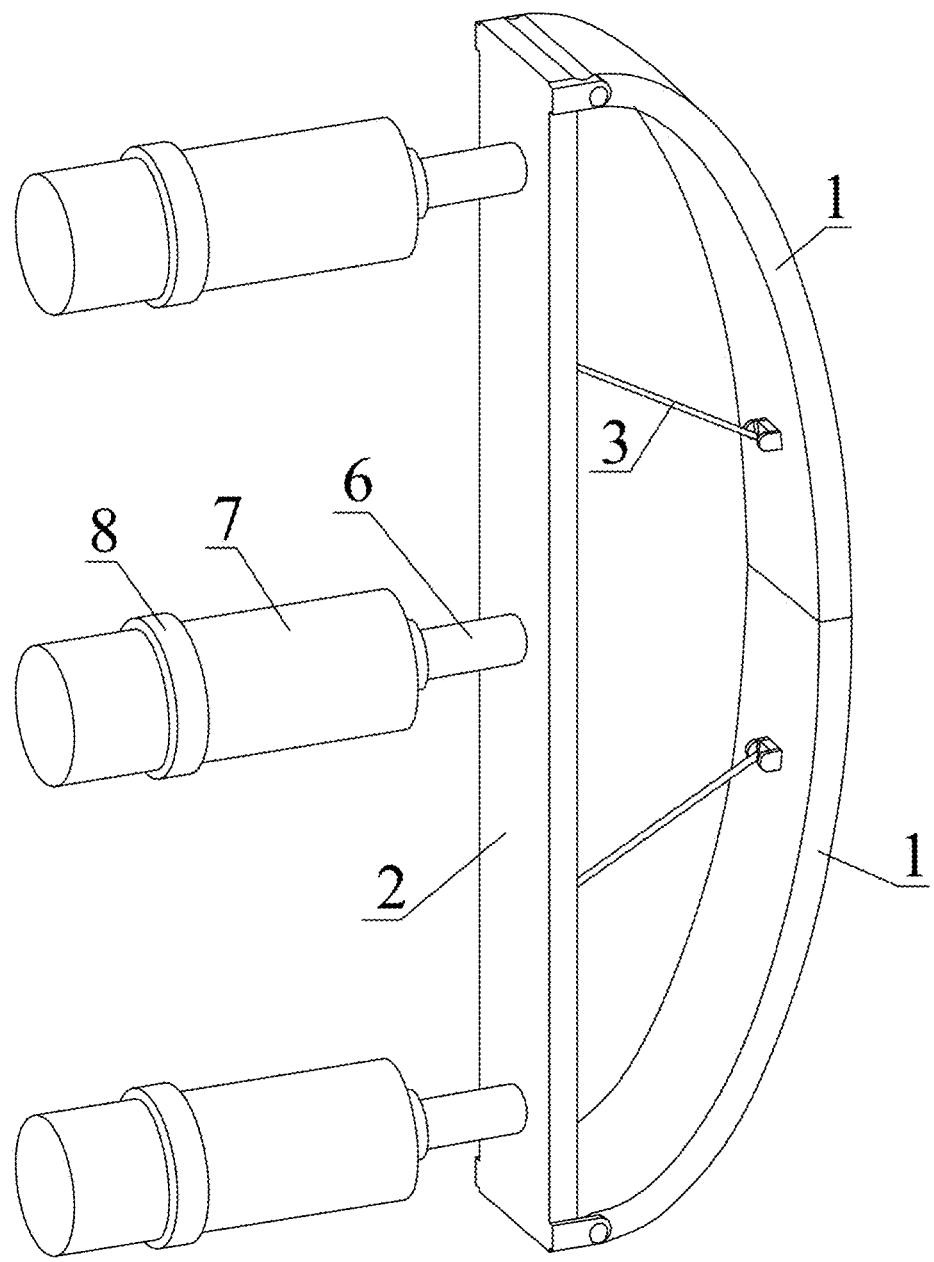
FIG. 1 is a front schematic diagram of a magnetorheological fluid automobile bumper proposed by the present disclosure.

Reference signs: 1, front bumper body; 2, rear bumper body; 3, connecting rod; 4, sliding seat; 5, first spring; 6, push rod; 7, outer sleeve; 8, magnet; 9, inner sleeve; 10, extrusion block; 11, push block; 12, second spring; 13, buffer block; and 14, third spring.

DETAILED DESCRIPTION OF THE EMBODIMENTS

The following clearly and completely describes the technical solutions in the embodiments of the present disclosure with reference to the attached figures in the embodiments of the present disclosure.

Referring to FIG. 1 to FIG. 8, a magnetorheological fluid automobile bumper includes a rear bumper body 2. Two front bumper bodies 1 are symmetrically hinged to the front side of the rear bumper body 2, and the ends, close to each other, of the two front bumper bodies 1 are in butt joint with each other. The two front bumper bodies 1 jointly form an arc-shaped bar. A connecting rod 3 is jointly installed between the front bumper body 1 and the rear bumper body 2. One end of the connecting rod 3 is hinged to the front bumper body 1, and the other end of the connecting rod 3 is slidably installed with the rear bumper body 2. The two front bumper bodies 1 are hinged with the end of the rear bumper body 2 through hinged seats, and the end, close to the front bumper bodies 1, of the connecting rod 3 is hinged with the inner sides of the front bumper bodies 1 through hinged seats.

A sliding chute is formed in the side, close to the front bumper bodies 1, of the rear bumper body 2. A sliding seat 4 is slidably arranged in the sliding chute. The end, away from the front bumper bodies 1, of the connecting rod 3 is hinged with the sliding seat 4. A first spring 5 is installed in the sliding chute. One end of the first spring 5 is connected with the sliding seat 4, and the other end of the first spring 5 is fixed with the tail end of the sliding chute.

After the bumper of a vehicle is collided, the impact force of the bumper firstly acts on the front bumper bodies 1. At this time, the front bumper bodies 1 are stressed and the impact force is transmitted to the rear bumper body 2 through the connecting rods 3. The sliding seats 4 and the first springs 5 on the rear bumper body 2 are used for realizing the first buffering and damping effect on the impact force transmitted by the front bumper bodies 1 and the connecting rods 3.

Figure 2:
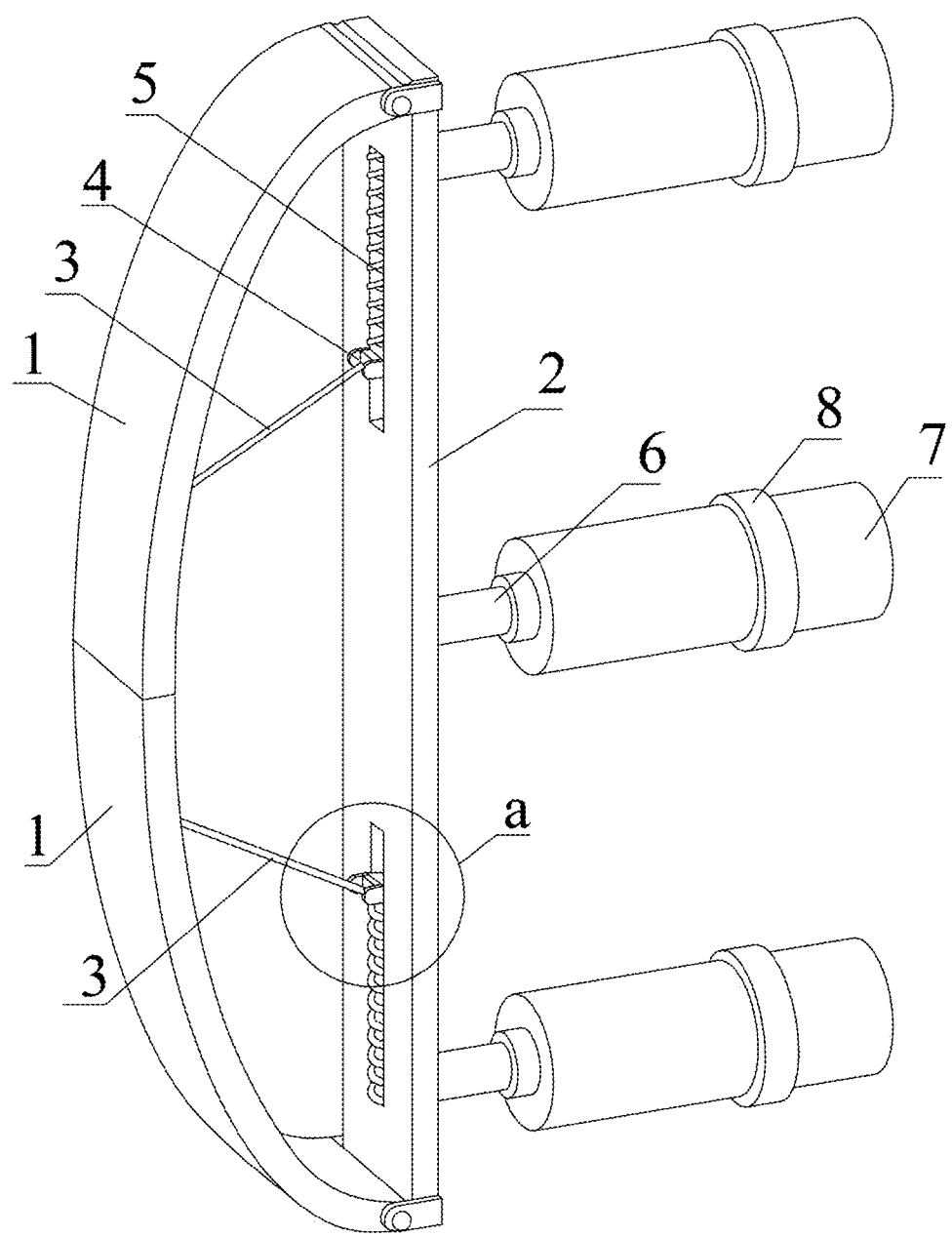
FIG. 2 is a rear schematic diagram of a magnetorheological fluid automobile bumper proposed by the present disclosure.
Figure 3:
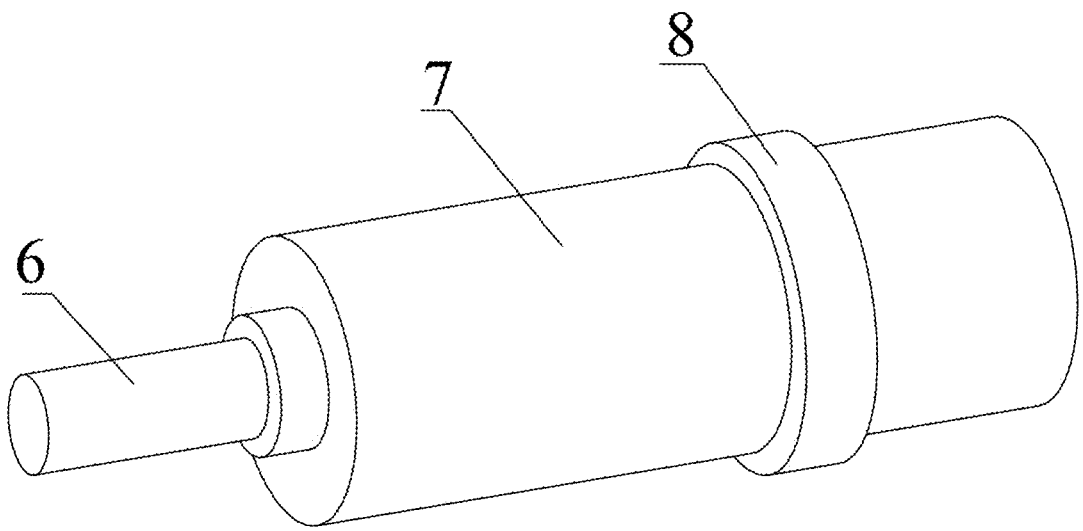
FIG. 3 is an overall schematic diagram of a magnetorheological fluid buffer in the present disclosure.
Figure 4:
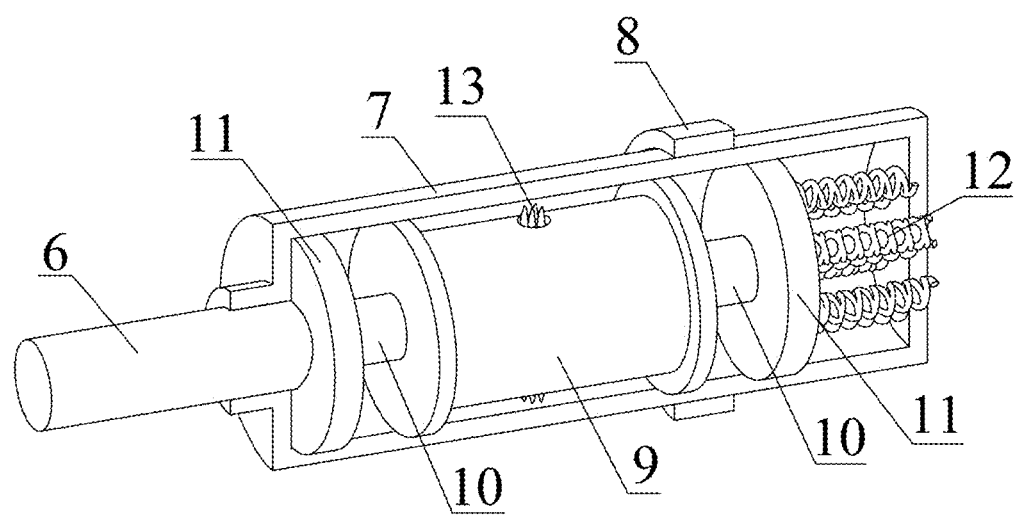
FIG. 4 is an internal section view of an outer sleeve.
Figure 5:
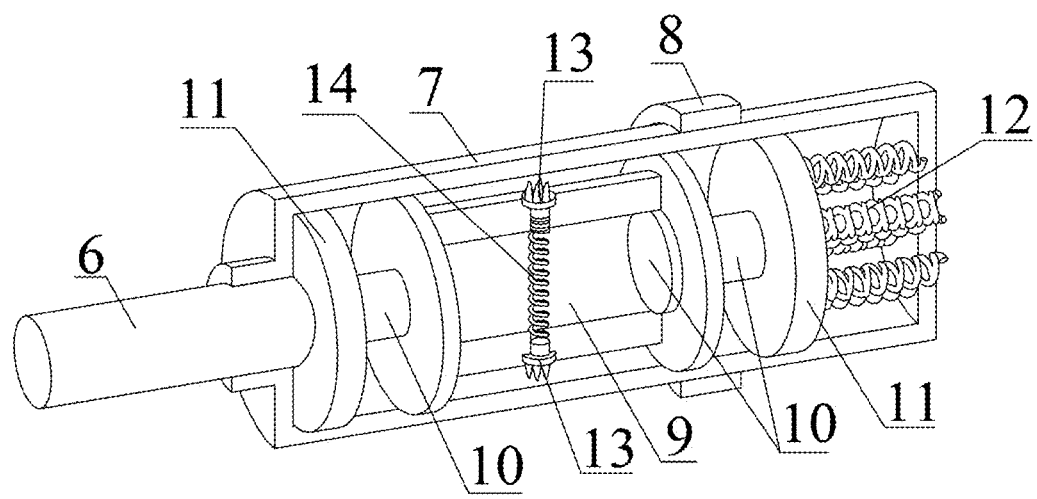
FIG. 5 is an internal section view of an inner sleeve.
Figure 6:
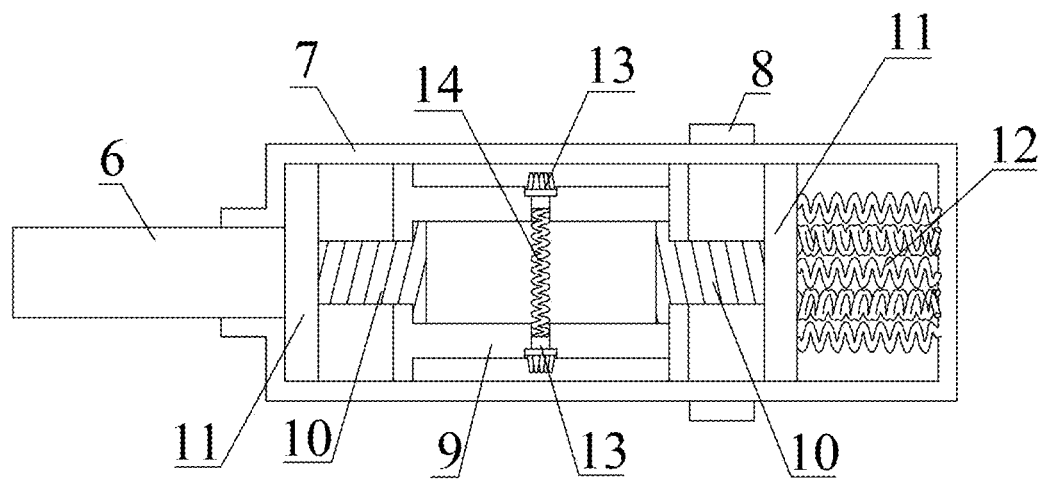
FIG. 6 is a state schematic diagram of an extrusion block inside the inner sleeve when the bumper is not stressed.
Figure 7:
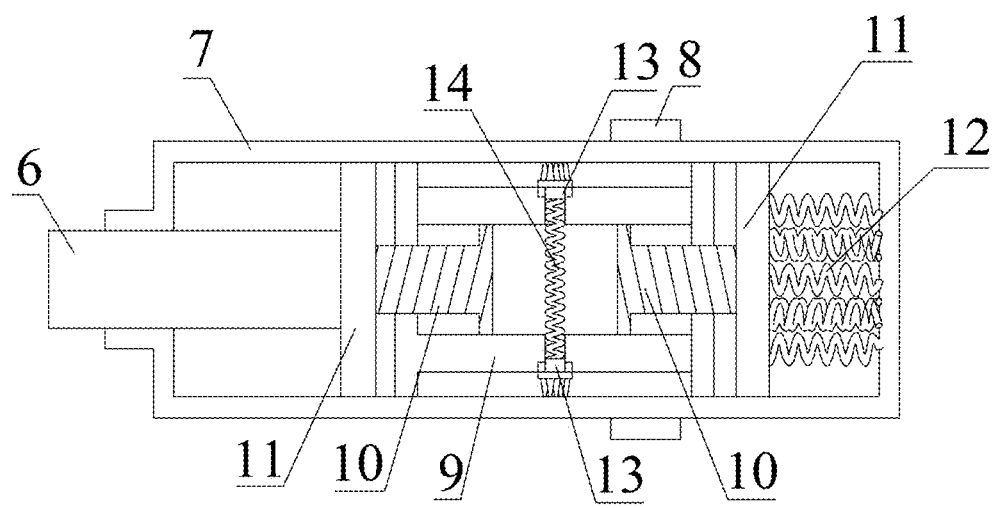
FIG. 7 is a state schematic diagram of an extrusion block inside the inner sleeve when the bumper is stressed.
Figure 8:
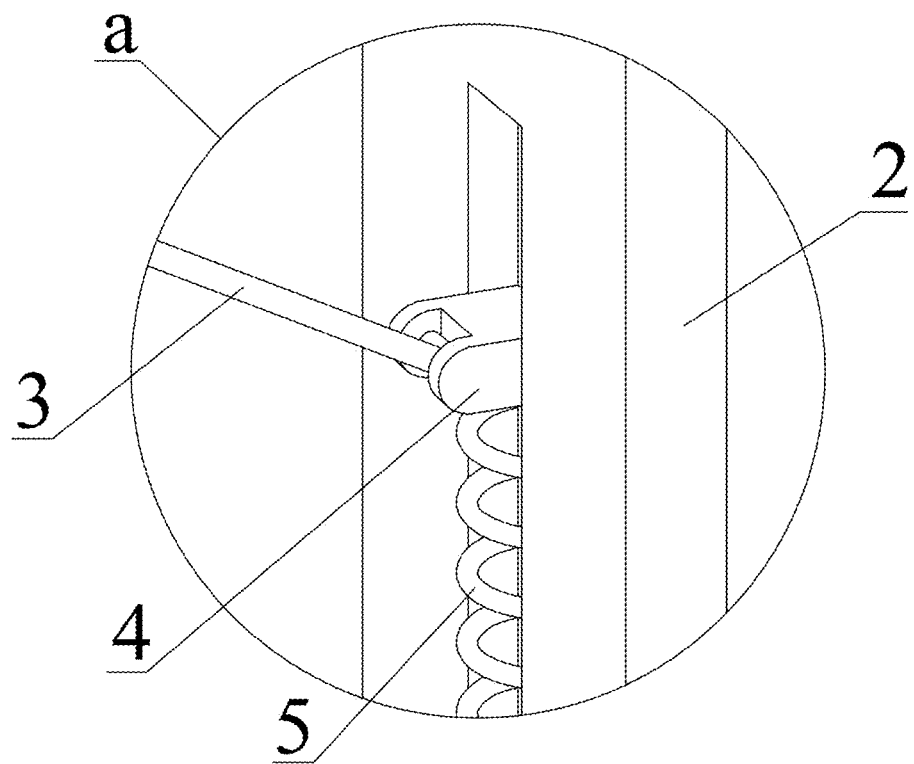
FIG. 8 is a structural enlarged view of the part a in FIG. 2.

A plurality of magnetorheological fluid buffers are installed on the rear side of the rear bumper body 2.While the first springs 5 realizes the first buffering and damping effect on the impact force transmitted by the front bumper bodies 1 and the connecting rods 3, the impact force is transmitted to each magnetorheological fluid buffer through the rear bumper body 2. Referring to FIG. 1 and FIG. 2, in the embodiment, three magnetorheological fluid buffers are taken as examples.

The magnetorheological fluid buffer includes an outer sleeve 7. A magnet 8 is installed on the outer side of the outer sleeve 7. A push rod 6 is slidably arranged at the front end of the outer sleeve 7. One end of the push rod 6 is installed with the rear bumper body 2. An inner sleeve 9 is movably arranged inside the outer sleeve 7. Two extrusion blocks 10 are symmetrically and slidably arranged at the two ends of the inner sleeve 9. The ends, away from each other, of the two extrusion blocks 10 are provided with push blocks 11. The end, away from the rear bumper body 2, of the push rod 6 extends into the outer sleeve 7 and is installed with one of the push blocks 11. The inner wall of the outer sleeve 7 at the end away from the push rod 6 is provided with second springs 12. The second springs 12 are installed with the other push block 11. The inner sleeve 9 is filled with a magnetorheological fluid. A fluid outlet is formed in the inner sleeve 9, and a buffer block 13 is slidably arranged in the fluid outlet. A third spring 14 is arranged in the inner sleeve 9. The buffer block 13 is installed with the third spring 14. The buffer block 13 is in frictional contact with the inner wall of the outer sleeve 7.

The extrusion block 10 is of a T-shaped structure. One end of the extrusion block 10 is slidably arranged inside the inner sleeve 9, and the other end of the extrusion block 10 is fixed with the push block 11. The end, positioned inside the inner sleeve 9, of the extrusion block 10 is provided with a sealing strip.

The impact force is firstly transmitted to the push rod 6 through the rear bumper body 2, and then transmitted to the push block 11 and the extrusion block 10 on the front side. At this time, the extrusion block 10 on the front side preliminarily extrudes the magnetorheological fluid inside the inner sleeve 9.

Two fluid outlets are symmetrically formed in the inner sleeve 9. Buffer blocks 13 are slidably arranged in the two fluid outlets. A sealing strip is arranged between the buffer block 13 and the fluid outlet. The two ends of the third spring 14 are fixedly installed with the two buffer blocks 13, respectively. The third spring 14 is installed with the buffer block 13, and the buffer block 13 is slidably arranged in the fluid outlet. Therefore, in the early stage of impact force transmission, the buffer block 13 does not directly leave the fluid outlet immediately, but transmits the impact force to the extrusion block 10 and the push block 11 on the rear side, and promotes the push block 11 to squeeze the second spring 12, so that the second buffering and damping effect can be realized by the second spring 12. In this process, the inner sleeve 9 and the magnetorheological fluid inside the inner sleeve 9 are displaced inside the outer sleeve 7. That is, the inner sleeve 9 and the magnetorheological fluid inside the inner sleeve 9 gradually approach the magnet 8 and gradually enter the magnetic field range.

When the impact force continues to be transmitted, the pressure of the magnetorheological fluid inside the inner sleeve 9 is increased, and the buffer block 13 is stressed to stretch the third spring 14 and leave the fluid outlet. At this time, the buffer block 13 forms frictional resistance with the inner wall of the outer sleeve 7, so that the third buffering and damping effect is realized. In addition, the magnetorheological fluid enters the gap between the outer sleeve 7 and the inner sleeve 9 at this time, and enters the magnetic field range of the magnet 8. Under the action of the magnetic field of the magnet 8, the viscosity of the magnetorheological fluid is increased, and the magnetorheological fluid is gradually "solidified". After the viscosity of the magnetorheological fluid is increased, the resistance with the outer sleeve 7 can be increased, the fluid outlets can also be blocked, so that the frictional resistance between the buffer block 13 and the inner wall of the outer sleeve 7 can be maintained, and the third buffering and damping effect is ensured.

The end of the buffer block 13 is provided with anti-skid convex teeth, and the anti-skid convex teeth are in frictional contact with the inner wall of the outer sleeve 7. Anti-skid concave ring grooves matched with the anti-skid convex teeth are formed in the inner wall of the outer sleeve 7.

The anti-skid convex teeth of the buffer block 13 are matched with the anti-skid concave ring grooves on the inner wall of the outer sleeve 7, and the frictional resistance generated by the anti-skid convex teeth and the anti-skid concave ring grooves can effectively buffer the impact force of the bumper.

What is claimed is:

1. A magnetorheological fluid automobile bumper, comprising a rear bumper body (2), wherein two front bumper bodies (1) are symmetrically hinged to a front side of the rear bumper body (2) that faces toward the two front bumper bodies (1), ends of the two front bumper bodies that are opposite to hinged ends of the two front bumper bodies (1) are joined together, a connecting rod (3) is jointly installed between one of the two front bumper bodies (1) and the rear bumper body (2), one end of the connecting rod (3) is hinged to the one of the two front bumper bodies (1), and an other end of the connecting rod (3) is slidably installed with the rear bumper body (2); and a plurality of magnetorheological fluid buffers are installed on a rear side of the rear bumper body (2) that faces away from the two front bumper bodies (1);

wherein the magnetorheological fluid buffer comprises an outer sleeve (7), a magnet (8) is installed on the outer side of the outer sleeve (7), a push rod (6) is slidably arranged at an end of the outer sleeve (7) closest to the rear bumper body, one end of the push rod (6) is installed with the rear bumper body (2), an inner sleeve (9) is movably arranged inside the outer sleeve (7), each of two ends of the inner sleeve (9) is slidably provided with one of two extrusion blocks (10), the two extrusion blocks (10) are symmetrically arranged at the two ends of the inner sleeve (9), sides of the extrusion blocks that face away from each other are provided with push blocks (11), an other end of the push rod (6) located away from the rear bumper body (2), extends into the outer sleeve (7) and is installed with one of the push blocks (11), the inner wall of the outer sleeve (7) at an other end of the outer sleeve farthest from the rear bumper body is provided with second springs (12), the second springs (12) are installed with an other one of the push blocks (11), the inner sleeve (9) is filled with a magnetorheological fluid, fluid outlets are formed in the inner sleeve (9), buffer blocks (13) are slidably arranged in the fluid outlets, respectively, a third spring (14) is arranged in the inner sleeve (9), the buffer blocks (13) are installed with the third spring (14), and the buffer blocks (13) are in frictional contact with the inner wall of the outer sleeve (7).

2. The magnetorheological fluid automobile bumper according to claim 1, wherein a sliding chute is formed in the side, close to the front bumper bodies (1), of the rear bumper body (2), a sliding seat (4) is slidably arranged in the sliding chute, the other end, away from the front bumper bodies (1), of the connecting rod (3) is hinged with the sliding seat (4), a first spring (5) is installed in the sliding chute, one end of the first spring (5) is connected with the sliding seat (4), and an other end of the first spring (5) is fixed with a tail end of the sliding chute that is opposite to the one end of the first spring (5) connected with the sliding seat (4).

3. The magnetorheological fluid automobile bumper according to claim 2, wherein each one of the two extrusion blocks (10) is of a T-shaped structure, one end of each one of the two the extrusion blocks (10) is slidably arranged inside the inner sleeve (9), and an other end of each one of the two the extrusion blocks (10) is fixed with a corresponding one of the push blocks (11), and the end, positioned inside the inner sleeve (9), of the extrusion block (10) is provided with a sealing strip.

4. The magnetorheological fluid automobile bumper according to claim 3, wherein two fluid outlets of the fluid outlets are symmetrically formed in the inner sleeve (9), a sealing strip is arranged between each of the buffer blocks (13) and a corresponding one of the fluid outlets, and two ends of the third spring (14) are fixedly installed with the two buffer blocks (13), respectively.

5. The magnetorheological fluid automobile bumper according to claim 4, wherein an end of each of the buffer blocks (13) that is facing the inner wall of the outer sleeve is provided with anti-skid convex teeth, and the anti-skid convex teeth are in frictional contact with the inner wall of the outer sleeve (7).

6. The magnetorheological fluid automobile bumper according to claim 5, wherein anti-skid concave ring grooves matched with the anti-skid convex teeth are formed in the inner wall of the outer sleeve (7).

7. The magnetorheological fluid automobile bumper according to claim 6, wherein each of the two front bumper bodies (1) are hinged with a corresponding one of longitudinal ends of the rear bumper body (2) through a hinged seat, and the one end, close to the front bumper bodies (1), of the connecting rod (3) is hinged with a side of each one of the front bumper bodies that faces toward the rear bumper body.

8. The magnetorheological fluid automobile bumper according to claim 7, wherein the two front bumper bodies (1) jointly form an arc-shaped bar.

* * * * *